United States Patent
Oikawa et al.

(10) Patent No.: US 7,243,199 B2
(45) Date of Patent: Jul. 10, 2007

(54) MEMORY DATA PROTECTION SYSTEM

(75) Inventors: Kiyoharu Oikawa, Kawasaki (JP);
Kimio Maruyama, Yokohama (JP);
Yasuhiro Watanabe, Yokohama (JP);
Naokazu Kuzuno, Kawasaki (JP);
Masaya Kubota, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 269 days.

(21) Appl. No.: 10/609,563

(22) Filed: Jul. 1, 2003

(65) Prior Publication Data

US 2004/0059883 A1 Mar. 25, 2004

(30) Foreign Application Priority Data

Jul. 3, 2002 (JP) ............................. 2002-194933

(51) Int. Cl.
*G06F 12/14* (2006.01)
(52) U.S. Cl. ..................... 711/163; 713/1; 710/200
(58) Field of Classification Search ................ 711/163; 713/1; 710/200
See application file for complete search history.

(56) References Cited

U.S. PATENT DOCUMENTS

| 5,293,424 A * | 3/1994 | Holtey et al. ............... 713/193 |
| 5,442,704 A * | 8/1995 | Holtey ........................ 711/163 |
| 6,643,751 B2 * | 11/2003 | Rosenquist et al. ......... 711/163 |

FOREIGN PATENT DOCUMENTS

| JP | 10-301855 | 11/1998 |
| JP | 11-110293 | 4/1999 |
| JP | 2001-14872 | 1/2001 |

OTHER PUBLICATIONS

Charles P. Pfleeger, Security in Computing, 1997, Prentice Hall PTR, second edition, pp. 4-15.*

* cited by examiner

*Primary Examiner*—Brian R. Peugh
*Assistant Examiner*—Jared Rutz
(74) *Attorney, Agent, or Firm*—Oblon, Spivak, McClelland, Maier & Neustadt, P.C.

(57) ABSTRACT

A memory data protection system is disclosed, which comprises a memory circuit, a protection contents indicating section which stores a security bit and a protection bit, a protection function circuit which determines permission/prohibition of reading of data from the memory circuit and permission/prohibition of writing of data to the memory circuit in accordance with the security bit and the protection bit, and a protection function locking/unlocking circuit which makes the protection function circuit in a lock state to forcibly prohibit reading of data from the memory circuit and writing of data into the memory circuit in a time period from when a power supply is turned on till when the protection function circuit completes reading of the security bit and the protection bit from the protection contents indicating section into data buses, and after lapse of the time period, the protection function locking/unlocking circuit unlocks the lock state.

14 Claims, 12 Drawing Sheets

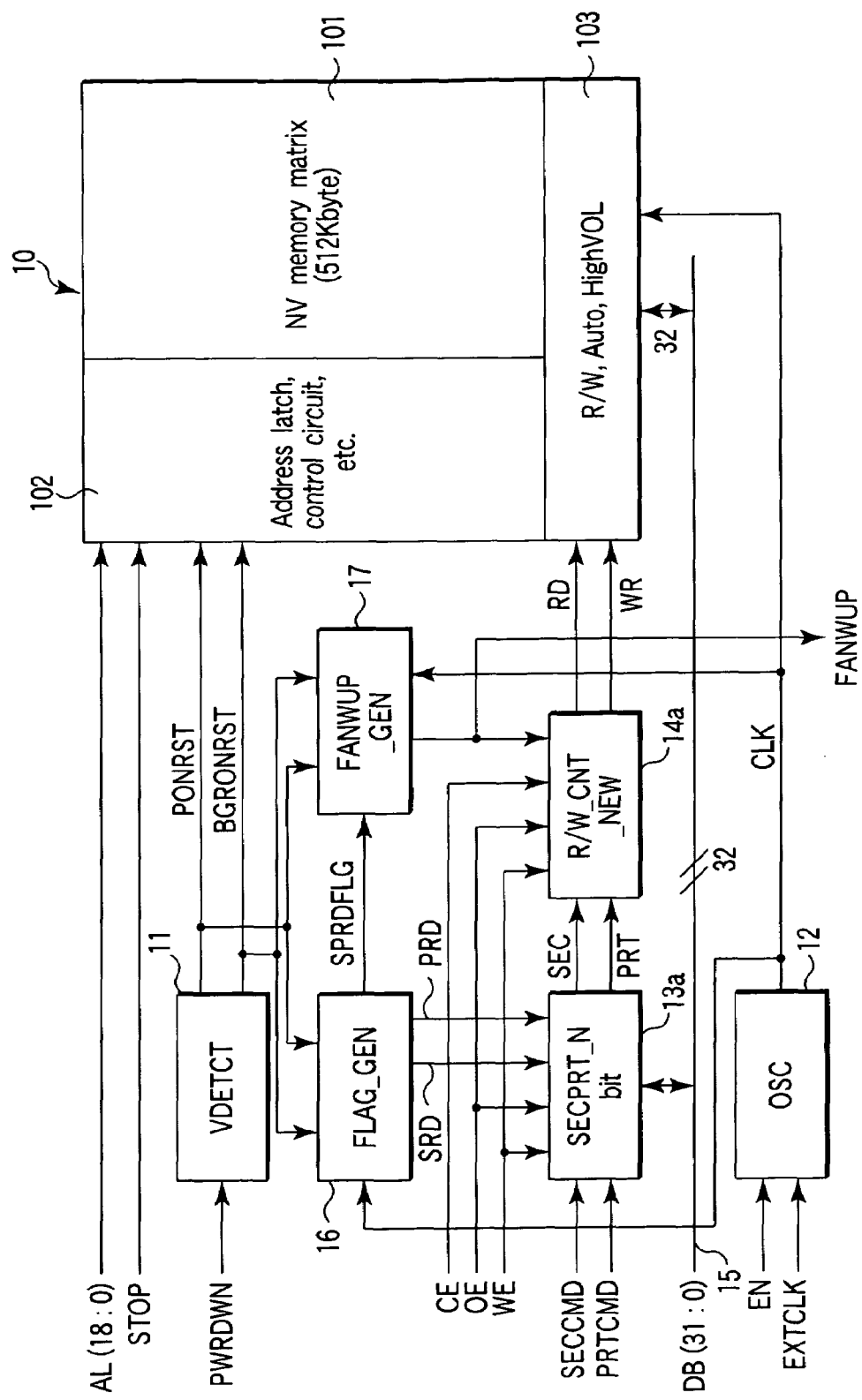
F I G. 1

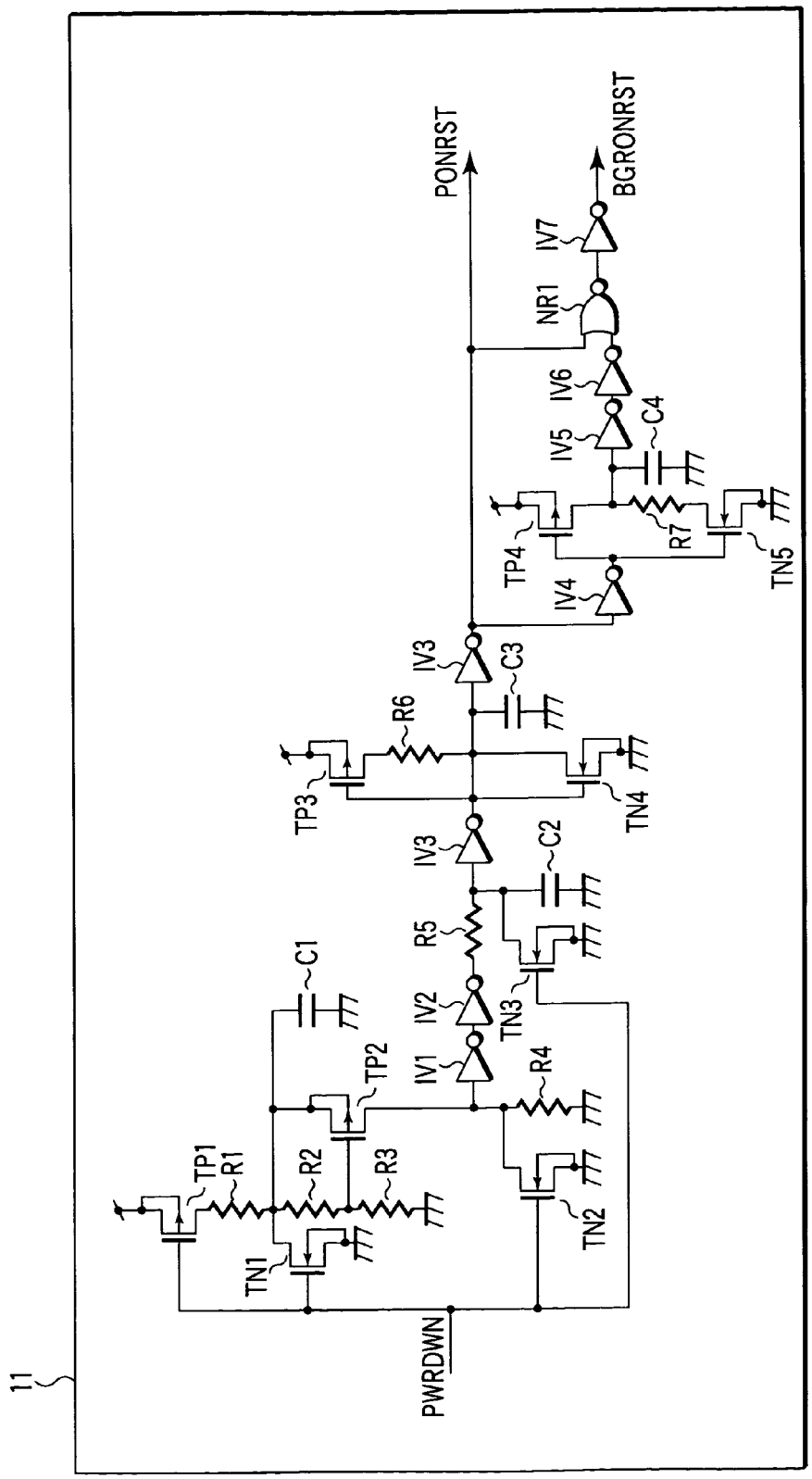
F I G. 4

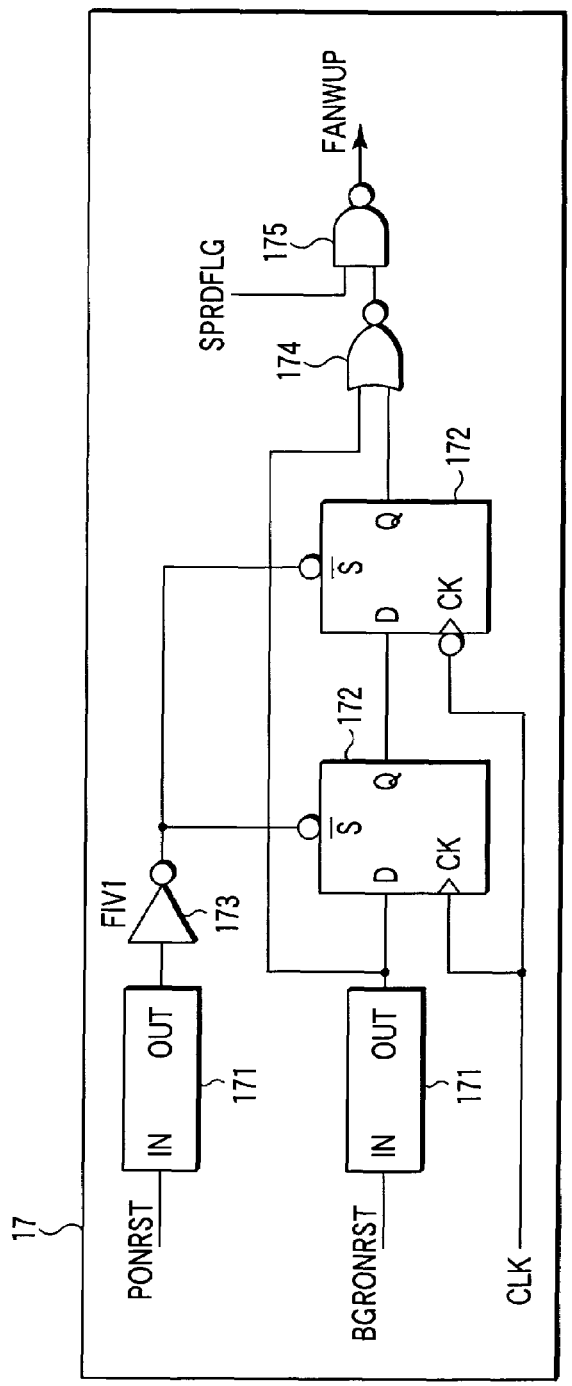
F I G. 7A
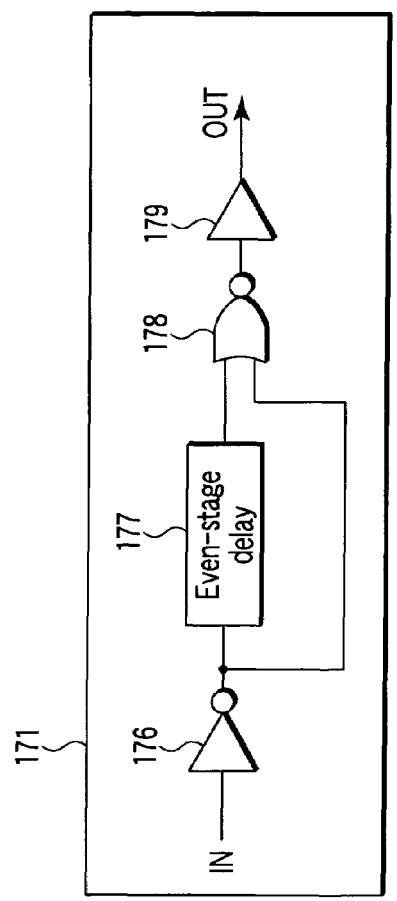
F I G. 7B

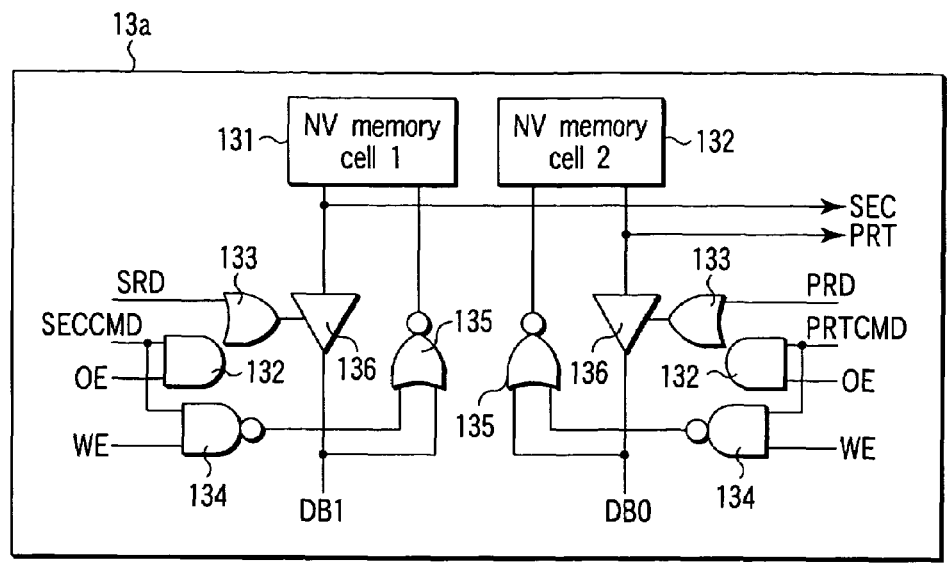
F I G. 8
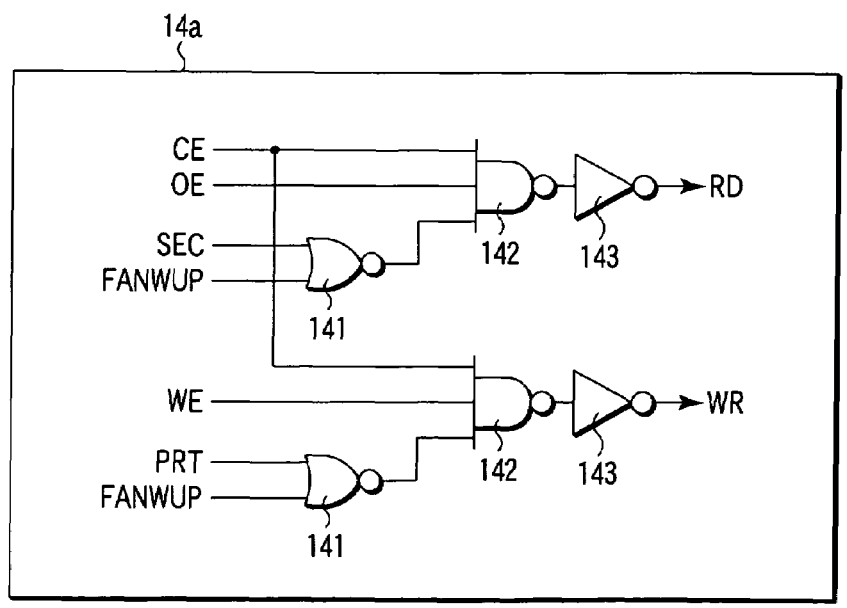
F I G. 9

MEMORY DATA PROTECTION SYSTEM

CROSS-REFERENCE TO RELATED APPLICATIONS

This application is based upon and claims the benefit of priority from the prior Japanese Patent Application No. 2002-194933, filed Jul. 3, 2002, the entire contents of which are incorporated herein by reference.

BACKGROUND OF THE INVENTION

1. Field of the Invention

The present invention relates to a data protection system that controls security and/or protection of contents that are stored in a nonvolatile semiconductor memory. Particularly, the present invention relates to a circuit that controls a security function and/or a protection function, and that is applied to a nonvolatile semiconductor memory chip or a nonvolatile semiconductor memory mixed logic chip such as a microcomputer chip.

2. Description of the Related Art

A microcomputer system that is loaded with a flash memory has a function of controlling security and protection of storage contents of the nonvolatile semiconductor memory, in order to secure confidentiality of the contents stored in the nonvolatile memory and safe operation of the microcomputer system.

FIG. 13 is a block diagram that shows a part of a conventional example of a nonvolatile semiconductor memory that is loaded with security and protection functions.

The nonvolatile semiconductor memory comprises a memory circuit 10 having a nonvolatile (NV) memory matrix, a voltage detecting circuit (VDECT) 11, an oscillation circuit (OSC) 12 for generating a clock signal CLK, a security bit/protection bit storing circuit (SECPRT bit) 13, a read/write control circuit (R/W_CNT) 14 for the memory circuit, and a data bus (DB) 15.

FIG. 14 shows a circuit configuration of the SECPRT bit 13 in the nonvolatile semiconductor memory shown in FIG. 13.

The SECPRTbit 13 comprises an NV memory cell 131 that stores the security bit SEC therein and an NV memory cell 132 that stores the protection bit PRT therein.

Upon receiving an output enable control signal OE and a security command SECCMD that are supplied from the microcomputer system controller, the SECPRTbit 13 outputs a security bit SEC to a data bus DB1, and upon receiving a write enable control signal WE and a protection command PRTCMD that are supplied from the microcomputer system controller, the SECPRTbit 13 outputs a protection bit PRT to a data bus DB 0.

FIG. 15 shows a circuit configuration of the R/W_CNT 14 in the nonvolatile semiconductor memory shown in FIG. 13.

Upon receiving the security bit SEC outputted from the SECPRTbit 13, and a chip enable control signal CE and the output enable control signal OE that are supplied from the microcomputer system controller, the R/W_CNT 14 generates a read control signal RD, and upon receiving the protection bit PRT outputted from the SECPRTbit 13, and the chip enable control signal CE and a write enable control signal WE that are supplied from the microcomputer system controller, the R/W_CNT 14 generates a write control signal WR of the memory circuit 10.

FIG. 16 is a timing chart that shows an operation example at the time of turning on the nonvolatile semiconductor memory shown in FIG. 13.

When the power supply is turned on, the nonvolatile semiconductor memory shown in FIG. 13 determines permission or prohibition of reading from and writing into the memory circuit 10, based on a state of a security bit SEC and a state of a protection bit PRT within the SECPRT bit 13.

In other words, when the security bit SEC is "1" (a LOCK state), the memory prohibits reading from the memory circuit 10, and when the security bit SEC is "0" (an UNLOCK state), the memory permits reading from the memory circuit 10.

When the protection bit PRT is "1" (a LOCK state), the memory prohibits writing to the memory circuit 10, and when the protection bit PRT is "0" (an UNLOCK state), the memory permits writing to the memory circuit 10.

However, if the security bit SEC stored in the SECPRT bit 13 is "0" (the UNLOCK state) at the time when the power supply is turned on in the state that a chip enable control signal CE is "1", a read control signal RD that is output from the R/W_CNT 14 becomes "1". Therefore, data in the memory circuit 10 is erroneously read into the data bus DB (31: 0) 15.

That is, immediately after the power supply is turned on, a malfunction of the memory occurs that the data is read out. At the time of turning on the power supply, the reading of the security bit SEC becomes unstable. Therefore, there is a problem that the security function is lowered, and the data stored in the memory circuit 10 is leaked out.

If the protection bit PRT stored in the SECPRT bit 13 is "0" (the UNLOCK state) at the time when the power supply is turned on in the state that the chip enable control signal CE is "1", a write control signal WR that is output from the R/W_CNT 14 becomes "1". Therefore, data in the data bus DB (31: 0) 15 is erroneously written into the memory circuit 10. As a result, program data is destructed, and the system does not work.

As explained above, according to the conventional nonvolatile semiconductor memory or a conventional microcomputer system that is loaded with the nonvolatile semiconductor memory, data is read out erroneously from the memory and data is written erroneously into the memory, immediately after the turning on of the power supply. As a result, program data is destructed, and the system does not work.

BRIEF SUMMARY OF THE INVENTION

According to an aspect of the present invention, there is provided a memory data protection system comprising a memory circuit having an array of memory cells; protection contents indicating section having non-volatile storage cells which store therein a security bit for indicating permission/prohibition of reading of data from the memory circuit and a protection bit for indicating permission/prohibition of writing of data to the memory circuit; a protection function circuit which determines permission/prohibition of reading of data from the memory circuit and permission/prohibition of writing of data to the memory circuit in accordance with the security bit and the protection bit stored in the protection contents indicating section; and a protection function locking/unlocking circuit which controls the protection function circuit in a manner that, the protection function locking/unlocking circuit makes the protection function circuit in a lock state to forcibly prohibit reading of data from the memory circuit and writing of data into the memory circuit in a time period from when a power supply is turned on or when a command is input till when the protection function circuit completes reading of the security bit and the protection bit from the protection contents indicating section into data buses, and after lapse of the time period, the protection function locking/unlocking circuit unlocks the lock state to enable the protection function circuit operative.

According to another aspect of the present invention, there is provided a memory data protection system comprising a memory circuit having an array of memory cells; a protection contents indicating section having a non-volatile storage cell which stores therein a security bit for indicating permission/prohibition of reading of data from the memory circuit; a protection function circuit which determines permission/prohibition of reading of data from the memory circuit in accordance with the security bit stored in the protection contents indicating section; and a protection function locking/unlocking circuit which controls the protection function circuit in a manner that, the protection function locking/unlocking circuit makes the protection function circuit in a lock state to forcibly prohibit reading of data from the memory circuit in a time period from when a power supply is turned on or when a command is input till when the protection function circuit completes reading of the security bit from the protection contents indicating section to a data bus, and after lapse of the time period, the protection function locking/unlocking circuit unlocks the lock state to enable the protection function circuit operative.

According to a further aspect of the present invention, there is provided a memory data protection system comprising a memory circuit having an array of memory cells; a protection contents indicating section having a non-volatile storage cell which stores therein a protection bit for indicating permission/prohibition of writing of data to the memory circuit; a protection function circuit which determines permission/prohibition of writing of data to the memory circuit in accordance with the protection bit stored in the protection contents indicating section; and a protection function locking/unlocking circuit which controls the protection function circuit in a manner that, the protection function locking/unlocking circuit makes the protection function circuit in a lock state to forcibly prohibit writing of data into the memory circuit in a time period from when a power supply is turned on or when a command is input till when the protection function circuit completes reading of the protection bit from the protection contents indicating section to a data bus, and after lapse of the time period, the protection function locking/unlocking circuit unlocks the lock state to enable the protection function circuit operative.

According to a further aspect of the present invention, there is provided a memory data protection system, wherein security/protection function is automatically locked in a time period from when a power supply is turned on till when reading of a security bit for indicating permission/prohibition of reading of data from an internal memory circuit and a protection bit for indicating permission/prohibition of writing of data to the internal memory circuit is completed, and after the time period, the lock state is unlocked.

According to a further aspect of the present invention, there is provided a memory data protection system, wherein security protection function is automatically locked in a time period from when a power supply is turned on till when reading of a security bit for indicating permission/prohibition of reading of data from an internal memory circuit is completed, and after the time period, the lock state is unlocked.

According to a further aspect of the present invention, there is provided a memory data protection system, wherein protection function is automatically locked in a time period from when a power supply is turned on till when reading of a protection bit for indicating permission/prohibition of writing of data to an internal memory circuit is completed, and after the time period, the lock state is unlocked.

BRIEF DESCRIPTION OF THE SEVERAL VIEWS OF THE DRAWING

FIG. 1 is a block diagram that shows a part of a nonvolatile semiconductor memory according to a first embodiment of the present invention;

FIG. 4 is a circuit diagram that shows one example of a VDECT of the nonvolatile semiconductor memory shown in FIG. 1;

FIG. 7A is a circuit diagram that shows one example of a FANWUP_GEN 17 of the nonvolatile semiconductor memory shown in FIG. 1;

FIG. 7B is a circuit diagram that shows one example of an FNSCAN 171 of the FANWUP_GEN 17 shown in FIG. 7A;

FIG. 8 is a circuit diagram that shows one example of a SECPRT_N bit of the nonvolatile semiconductor memory shown in FIG. 1;

FIG. 9 is a circuit diagram that shows one example of a R/W_CNT_NEW of the nonvolatile semiconductor memory shown in FIG. 1;

FIG. 10 is a flowchart that shows an automatic processing sequence relating to security and protection immediately after the power supply of the nonvolatile semiconductor memory shown in FIG. 1 is turned on;

DETAILED DESCRIPTION OF THE INVENTION

An embodiment according to the present invention will be explained in detail hereinafter with reference to the accompanying drawings.

FIG. 1 shows a part of a nonvolatile semiconductor memory that is loaded with security and protection functions according to the embodiment of the present invention.

Figure 13:
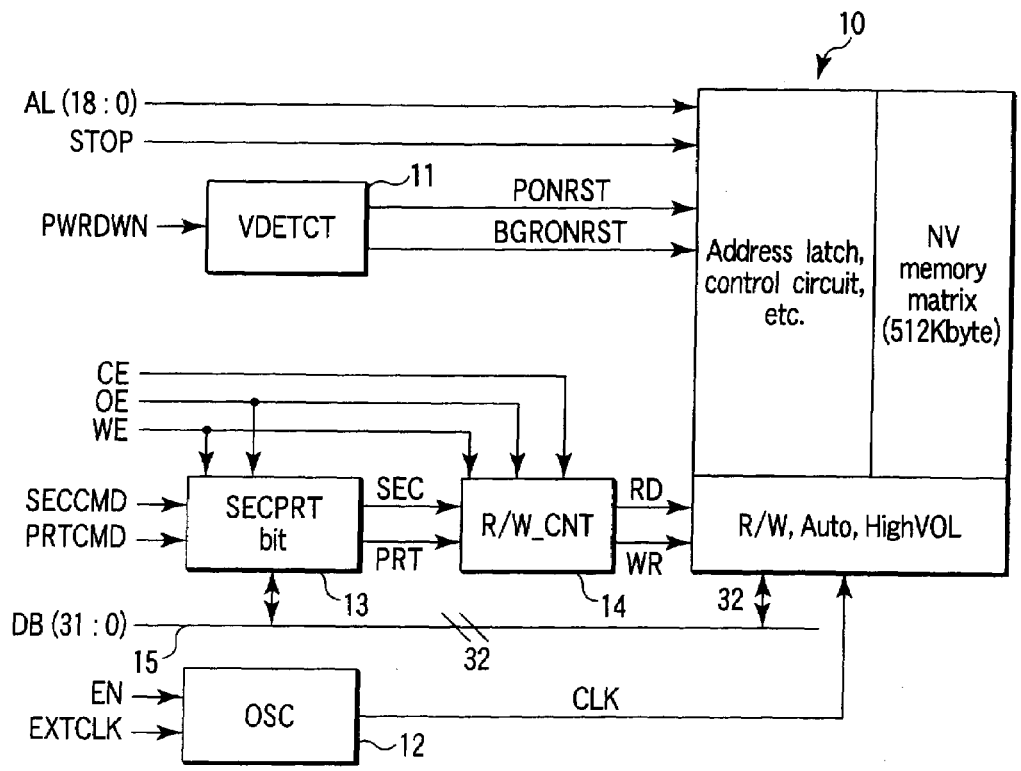
FIG. 13 is a block diagram that shows a part of a conventional example of a nonvolatile semiconductor memory that is loaded with security and protection functions.

As in the conventional nonvolatile semiconductor memory described with reference to FIG. 13, the nonvolatile semiconductor memory of the present embodiment a memory circuit having an array of memory cells and a protection contents indicating section. The protection contents indicating section stores therein a security bit SEC and a protection bit PRT. The security bit SEC indicates permission or prohibition of reading data from the memory circuit, and the protection bit PRT indicates permission or prohibition of writing data to the memory circuit.

Also, as in the conventional nonvolatile semiconductor memory described with reference to FIG. 13, the nonvolatile semiconductor memory of the present embodiment comprises a protection function circuit (security/protection function circuit). The protection function circuit automatically determines permission or prohibition of reading data from the memory circuit and permission or prohibition of writing data into the memory circuit, in accordance with the security bit SEC and the protection bit PRT stored in the protection contents indicating section, based on turning on of a power supply or input of a command.

However, unlike the conventional nonvolatile semiconductor memory described with reference to FIG. 13, the nonvolatile semiconductor memory of the present embodiment comprises a protection function locking/unlocking circuit. The protection function locking/unlocking circuit controls the protection function circuit in a manner that the protection function locking/unlocking circuit locks the protection function circuit to thereby forcibly prohibit reading of data from the memory circuit writing of data into the memory circuit during a time period from when a power supply is turned on or when a command is input from outside till when the protection function circuit completes reading of the security bit and the protection bit from the protection contents indicating section to data buses, and after lapse of the time period, the protection function locking/unlocking circuit unlocks the lock state of the protection function circuit thereby to enable the protection function circuit operative.

The nonvolatile semiconductor memory according to the present embodiment shown in FIG. 1 is the same as the conventional nonvolatile semiconductor memory in that the memory comprises the memory circuit 10 that is used for a program memory or a data memory of a microcomputer system, the voltage detecting circuit (VDECT) 11, the oscillation circuit (OSC) 12, and the data bus (DB) (31: 0) 15, except the following.

(1) The nonvolatile semiconductor memory according to the present embodiment comprises a data protection function clock/unlocking circuit comprised of a security/protection flag generating circuit (FLAG_GEN) 16 and a security/protection function control signal generating circuit (FANWUP_GEN) 17.

(2) With the provision of data protection function clock/unlocking circuit, in the nonvolatile semiconductor memory according to the present embodiment, the security bit/protection bit storing circuit (SECPRT bit) 13 which is the data protection contents indicating section, and the read/write control circuit (R/W_CNT) 14 for the memory circuit which is the security/protection function circuit, are modified to an (SECPRT_N bit) 13a and an (R/W_CNT_N) 14a, respectively.

Figure 2:
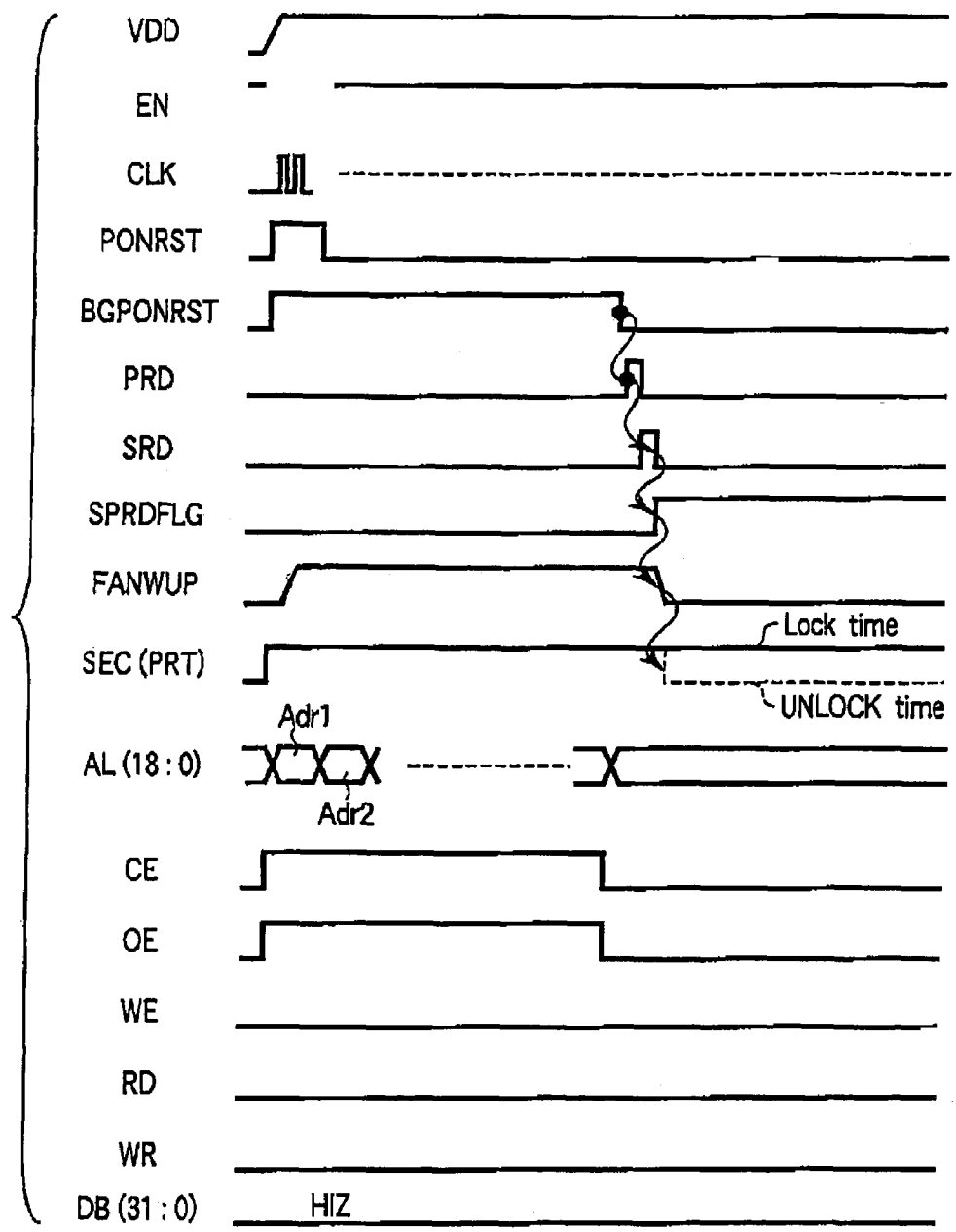
FIG. 2 is a timing chart that shows an operation example relating to security and protection at the time of turning on a power supply of the nonvolatile semiconductor memory shown in FIG. 1.

FIG. 2 is a timing chart that shows an operation example relating to security and protection at the time of turning on a power supply of the nonvolatile semiconductor memory shown in FIG. 1.

A configuration and an operation of each section of the nonvolatile semiconductor memory shown in FIG. 1 will be explained with reference to FIG. 2.

Figure 3:
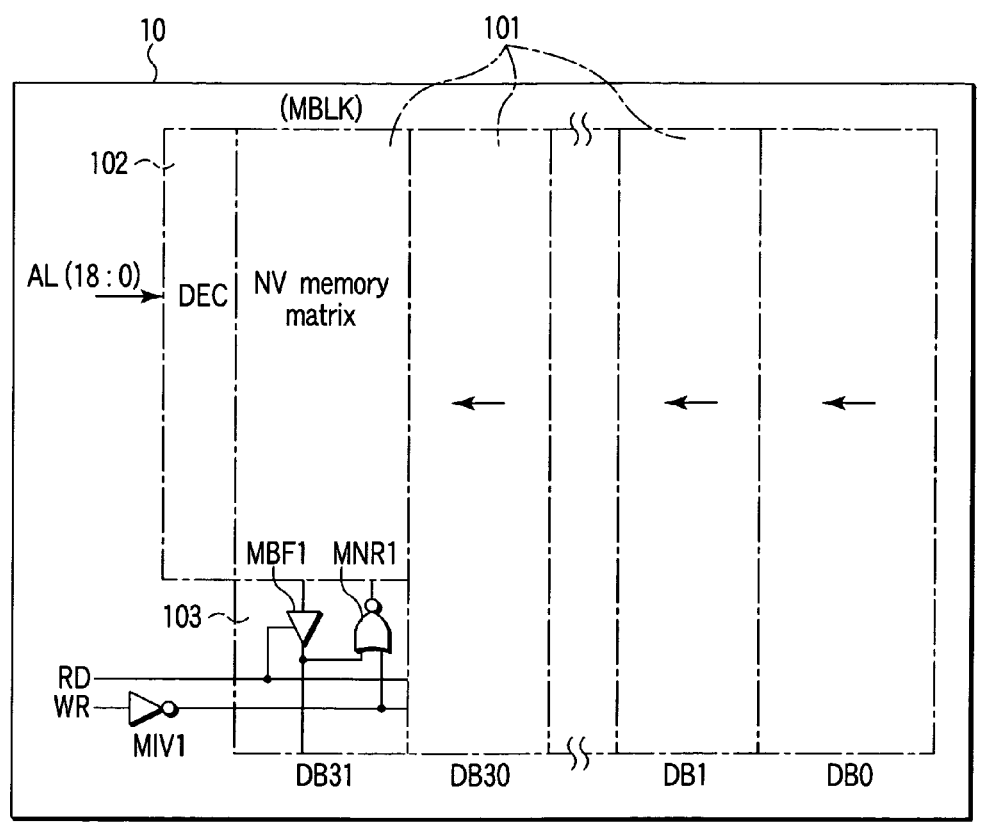
FIG. 3 is a circuit diagram that shows one example of a memory circuit of the nonvolatile semiconductor memory shown in FIG. 1.

FIG. 3 is a circuit diagram that shows one example of the memory circuit 10 of the nonvolatile semiconductor memory shown in FIG. 1.

As in the conventional memory circuit, the memory circuit 10 has a nonvolatile (NV) memory matrix 101 of for example, 512 Kbyte, an address latch circuit and address decoder DEC 102, and a read/write circuit (R/W circuit) 103. Data of 32 bit width are input/output between the memory circuit 10 and data bus DB0-DB31. An address data AL(18:0) is input to the address decoder DEC 102. A read control signal RD and a write control signal WR are input to the R/W circuit 103 from the (R/W_CNT_N) 14a.

FIG. 4 is a circuit diagram that shows one example of the VDECT 11 of the nonvolatile semiconductor memory shown in FIG. 1.

The VDECT is comprised of a combination of a plurality of logic circuits and delay circuits, as in the conventional example. When the power supply is turned on in the state that the logic level of a power down signal PWRDWN is "0", the VDECT generates a power-on reset signal PONRST and a band-gap-on reset signal BGRONRST, in order to initialize the memory. The PONRST is a one-shot pulse that becomes in a short-time active state ("1" level) when the power supply is turned on. After the power supply is turned on, the BGRONRTST becomes in an active state (for a longer time than the PONRST) until when a band gap voltage circuit (not shown) starts to operate.

Figure 5:
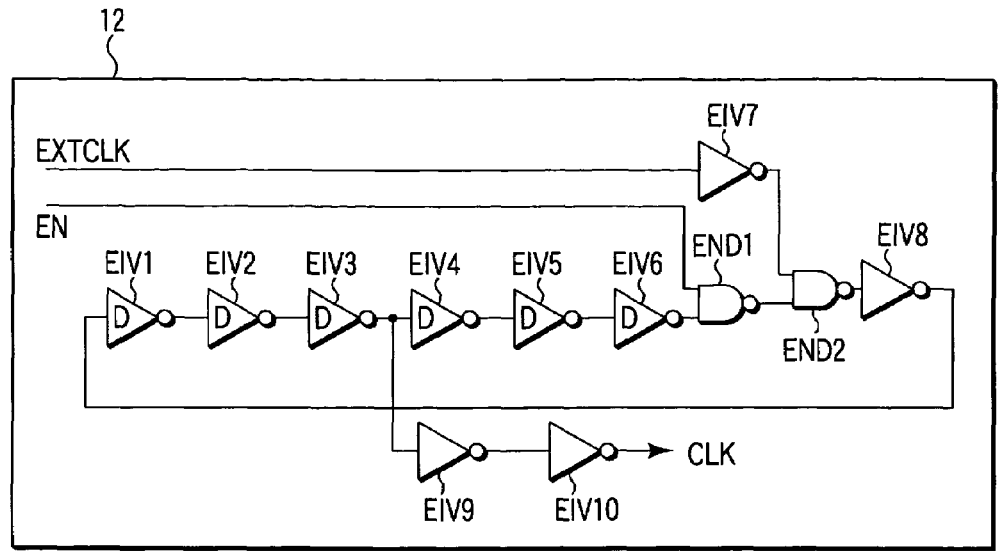
FIG. 5 is a circuit diagram that shows one example of an OSC of the nonvolatile semiconductor memory shown in FIG. 1.

FIG. 5 is a circuit diagram that shows one example of the OSC 12 of the nonvolatile semiconductor memory shown in FIG. 1.

As in the conventional example, the OSC circuit 12 comprises a ring oscillation circuit having a plurality of inverter circuits connected in a ring shape, and a plurality of logic circuits. The OSC circuit 12 generates an internal clock signal CLK, upon receiving an enable signal EN from a microcomputer system controller, and an external clock signal EXTCLK. The CLK is supplied to the R/W, an AUTO, a Highvol 103, the FLAG_GEN 16, and the FANWUP_GEN 17 shown in FIG. 1.

Figure 6:
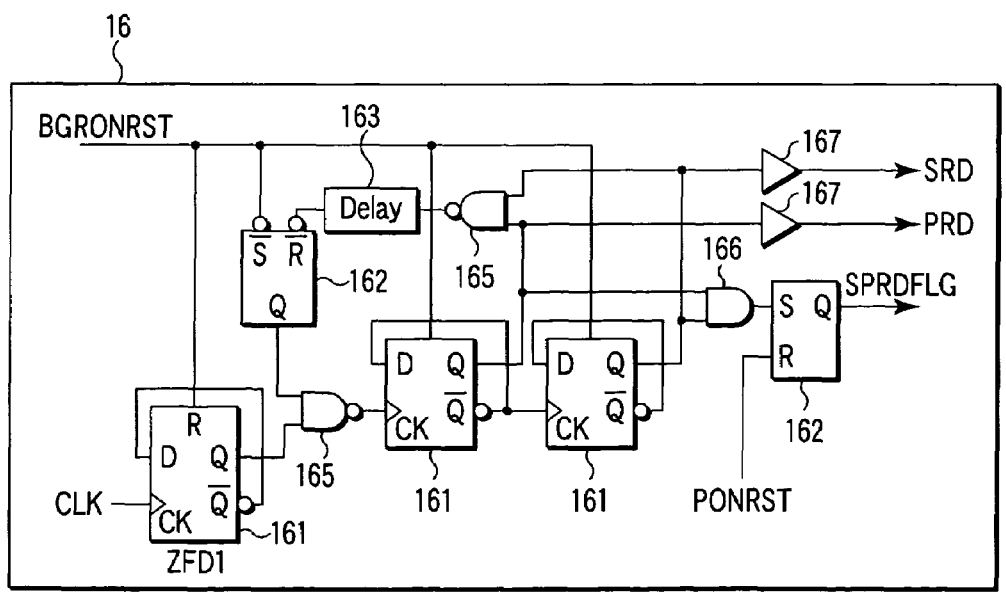
FIG. 6 is a circuit diagram that shows one example of a FLAG_GEN of the nonvolatile semiconductor memory shown in FIG. 1.

FIG. 6 is a circuit diagram that shows one example of the FLAG_GEN 16 of the nonvolatile semiconductor memory shown in FIG. 1.

The FLAG_GEN 16 has a plurality of flip-flop circuits 161 that form a counter circuit, a latch circuit 162, a delay circuit 163, a NAND gate 165, an AND gate 166, and a buffer circuit 167.

The FLAG_GEN 16 is reset based on the PONRST and the BGRONRST that are supplied from the VDECT 11. Upon receiving the CLK supplied from the OSC circuit 12, the FLAG_GEN 16 sequentially generates a protection bit read control signal PRD and a security bit read control signal SRD that become in a short-time active state. The FLAG_GEN 16 also generates a security and protection unlock signal SPRDFLG.

The SPRDFLG becomes at the "0" level for a predetermined period from the generation of the PONRST till immediately after the generation of the PRD and the SRD.

Thereafter, the SPRDFLG becomes at the "1" level. The SPRDFLG is used to control the locking of the operation of the security and protection functions.

FIG. 7A is a circuit diagram that shows one example of the FANWUP_GEN 17 of the of the nonvolatile semiconductor memory shown in FIG. 1.

The FANWUP_GEN 17 has two function scan circuits (FNSCAN) 171 having a noise cancellation function for the PONRST and the BGRONRST respectively that are supplied from the VDECT 11, a flip-flop circuit 172, an inverter 173, a NOR gate 174, and a NAND gate 175.

The FANWUP_GEN 17 generates a security/protection lock signal FANWUP when the FANWUP_GEN 17 receives CLK supplied from the OSC circuit 12 and SPRDFLG supplied from the FLAG_GEN 16 after it is reset by the PONRST and the BGRONRST.

The security/protection lock signal FANWUP is in "1" level (active level) in a time period from when the PONRST is generated to when the SPRDFLG goes to "1" level. The security/protection lock signal FANWUP goes to "0" level after lapse of the time period.

The lock/unlock signal FANWUP is used to control the unlocking of the operation lock state of the security and protection functions. At the same time, the lock/unlock signal FANWUP is output as a monitoring signal for the microcomputer system to decide the operation state (lock or unlocking) of the security and protection functions.

FIG. 7B is a circuit diagram that shows one example of the FNSCAN 171 of the FANWUP_GEN 17 of the nonvolatile semiconductor memory shown in FIG. 7A.

The FNSCAN has an inverter 176, an even-stage delay gate 177, a NOR gate 178, and a buffer circuit 179. The FNSCAN has a noise cancellation function of removing a whiskered noise when it is mixed into an input signal IN.

FIG. 8 is a circuit diagram that shows one example of the SECPRT_N bit 13*a* of the nonvolatile semiconductor memory shown in FIG. 1.

The SECPRT_N bit 13*a* comprises an NV memory cell 131 that stores the security bit SEC therein, an NV memory cell 132 that stores the protection bit PRT therein, and a plurality of logic circuits (AND gates 132, OR gates 133, NAND gates 134, NOR gates 135, and buffer gates 136) that read and write the security bit SEC and the protection bit PRT between the SECPRT_N bit 13*a* and the data buses DB1 and DB 0.

Upon receiving the protection command PRTCMD that is supplied from the microcomputer system controller, the SECPRT_N bit 13*a* reads and writes the protection bit PRT from and to the data bus DB0 based on an output enable control signal OE and a write enable control signal WE. The SECPRT_N bit 13*a* also carries out reading of data when the PRD supplied from the FANWUP_GEN 16 is in the active state ("1"), and outputs the read data to the microcomputer system via the data bus DB0. When the protection bit PRT is "1", the protection bit PRT indicates a LOCK state that the writing to the memory circuit 10 is prohibited. When the protection bit PRT is "0", the protection bit PRT indicates an UNLOCK state that the writing to the memory circuit 10 is permitted.

Upon receiving the security command SECCMD that is supplied from the microcomputer system controller, the SECPRT_N bit 13*a* reads and writes the security bit SEC from and to the data bus DB1 based on an output enable control signal OE and a write enable control signal WE. The SECPRT_N bit 13*a* also carries out reading of data when the SRD supplied from the FANWUP_GEN 16 is in the active state ("1"), and outputs the read data to the microcomputer system via the data bus DB1. When the security bit SEC is "1", the security bit SEC indicates a LOCK state that the reading from the memory circuit 10 is prohibited. When the security bit SEC is "0", the security bit SEC indicates an UNLOCK state that the reading from the memory circuit 10 is permitted.

In the above example, the number of a PRT storing cell and the number of a SEC storing cell are one, respectively, as shown in the SECPRT_N bit 13*a* in FIG. 8. When the numbers of these cells increase, the number of logic circuits for reading and writing is increased accordingly at each time of the increase. The number of stages of the counter circuit in the FANWUP_GEN 17 is increased thereby to increase the numbers of the PRDs and the SRDs, respectively.

FIG. 9 is a circuit diagram that shows one example of the R/W_CNT_NEW 14*a* of the nonvolatile semiconductor memory shown in FIG. 1.

The R/W_CNT_NEW 14*a* has a NOR gate 141, a NAND gate 142, and an inverter circuit 143.

The R/W_CNT_NEW 14*a* receives the chip enable control signal CE and the write enable control signal WE that are supplied from the microcomputer system controller, the protection bit PRT that is read from the SECPRT_N bit 13*a*, and the lock/unlock signal FANWUP that is supplied from the FANWUP_GEN 17. When the lock/unlock signal FANWUP indicates the unlock state ("0"), the R/W_CNT_NEW 14*a* generates a write control signal WR for controlling writing to the memory circuit 10.

Also, the R/W_CNT_NEW 14*a* receives the chip enable control signal CE and the output enable control signal OE that are supplied from the microcomputer system controller, the security bit SEC that is read from the SECPRT_N bit 13*a*, and the lock/unlock signal FANWUP that is supplied from the FANWUP_GEN 17. When the lock/unlock signal FANWUP indicates the unlock state ("0"), the R/W_CNT_NEW 14*a* generates a read control signal RD for controlling reading from the memory circuit 10.

Here, an operation example relating to security and protection at the time of turning on the power supply of the nonvolatile semiconductor memory shown in FIG. 1 will be explained with reference to the timing chart shown in FIG. 2.

When the power supply is turned on, the memory is initialized based on the PONRST and the BGRONRST that are output from the VDECT 11. When the initialization is completed, the SRD and the PRD that are output from the FLAG_GEN 16 sequentially become in the short-time active state, and the security bit SEC and the protection bit PRT within the SECPRT_N bit 13*a* are read out to the data buses DB1 and DB0.

Thereafter, permission or prohibition of the reading from and writing into the memory circuit 10 is determined based on the states of the security bit SEC and the protection bit PRT. In other words, when the security bit SEC is "1" (the LOCK state), the reading from the memory circuit 10 becomes in the prohibition state. When the security bit SEC is "0" (the UNLOCK state), the reading from the memory circuit 10 becomes in the permission state.

When the protection bit PRT is "1" (the LOCK state), the writing to the memory circuit 10 becomes in the prohibition state. When the protection bit PRT is "0" (the UNLOCK state), the writing to the memory circuit 10 becomes in the permission state.

In the above operation, during a predetermined period from the turning on of the power supply till the completion of the reading of the security bit SEC and the protection bit PRT to the data buses, the SPRDFLG that is output from the PLAG_GEN 16 becomes "0", and the lock/unlock signal FANWUP that is output from the FANWUP_GEN 17 becomes "1".

As a result, the read control signal RD and a write control signal WR that are output from the R/W_CNT_NEW 14a become "0", respectively, thereby to prohibit the data reading from the NV memory and the data writing to the NV memory.

The PONRST and the BGRONRST that are output from the VDECT 11 return from "1" to "0", respectively, and the security bit SEC and the protection bit PRT are read out to the data buses. After ending the above operation, the SPRDFLG changes from "0" to "1", and the lock/unlock signal FANWUP changes from "1" to "0".

Therefore, even if the security bit SEC stored in the SECPRT_N bit 13a is "0" (the UNLOCK state) at the time of turning on the power supply in the state that the CE input is "1" and the OE input is "1", the R/W_CNT_NEW 14a controls not to read out the data from the memory circuit 10 into the data buses in a time period from the turning on of the power supply until the completion of the reading of the security bit SEC into the data buses, unlike the conventional nonvolatile semiconductor memory.

Similarly, even if the protection bit PRT stored in the SECPRT_N bit 13a is "0" (the UNLOCK state) at the time of turning on the power supply in the state that the CE input is "1" and the WE input is "1", the R/W_CNT NEW 14a controls not to read out the data from the data buses into the memory circuit 10 in a time period from the turning on of the power supply until the completion of the reading of the protection bit PRT into the data buses, unlike the conventional nonvolatile semiconductor memory.

In the above operation, as the number of bits of the security bit SEC and the protection bit PRT that are stored in the SECPRT_N bit 13a is larger, the time required to read the security bit SEC and the protection bit PRT becomes longer. Therefore, the unlocking time of security and protection at the time of turning on the power supply is delayed.

Figure 10:
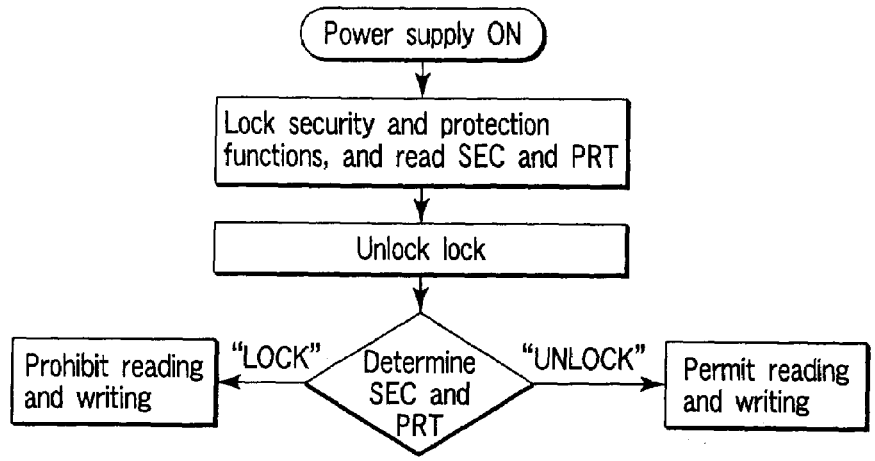

FIG. 10 is a flowchart that shows an automatic processing sequence relating to security and protection immediately after the power supply of the memory shown in FIG. 1 is turned on.

During a predetermined period from the turning on of the power supply till the completion of automatically reading the security bit SEC and the protection bit PRT, the security and protection functions are automatically set to a lock state. After a lapse of the predetermined period, the lock state is automatically unlocked.

With the function of automatically executing the above sequence operation, it is possible to prevent the malfunction of the security and protection functions (such as a reading of abnormal data, a leakage of confidential data from the NV memory, and a destruction of program data due to a writing of abnormal data into the NV memory) immediately after the turning on of the power supply.

In the above embodiment, the sequence operation relating to security and protection is automatically executed immediately after the power supply is turned on. It is also possible to change or add a structure to execute the above sequence operation based on the input of a command at a desired timing after the power supply is turned on.

Figure 11:
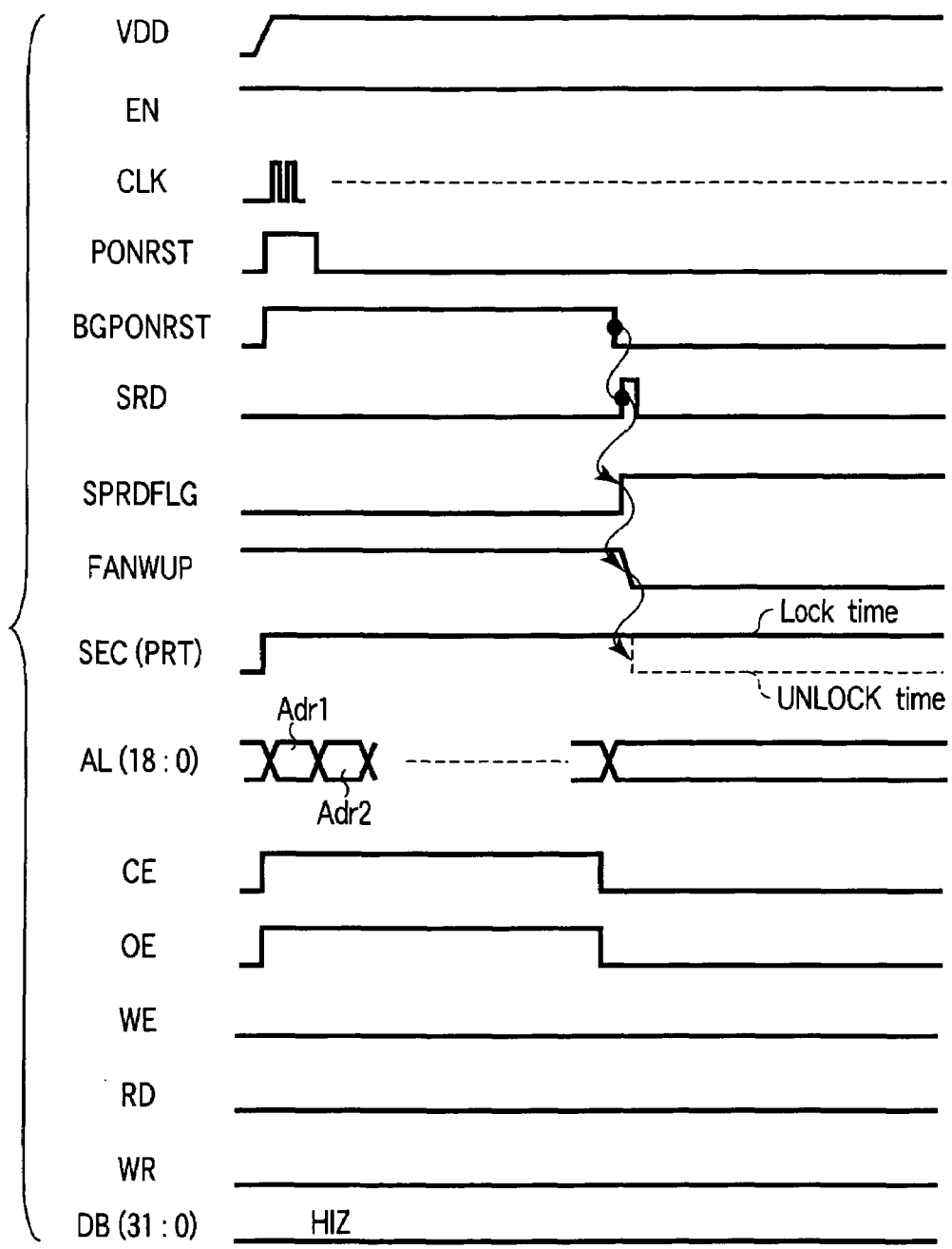
FIG. 11 is a timing chart that shows an operation example relating to security at the time of turning on a power supply in a modified example of the nonvolatile semiconductor memory shown in FIG. 1.

Also, in the above embodiment, permission or prohibition of reading data from the memory circuit and permission or prohibition of writing data into the memory circuit are carried out by using the security bit SEC and the protection bit PRT. However, it is possible to perform permission or prohibition of reading data from the memory circuit alone, as shown in FIG. 11. FIG. 11 is a timing chart that shows an operation example relating to security at the time of turning on a power supply in a modified example of the nonvolatile semiconductor memory shown in FIG. 1.

Figure 12:
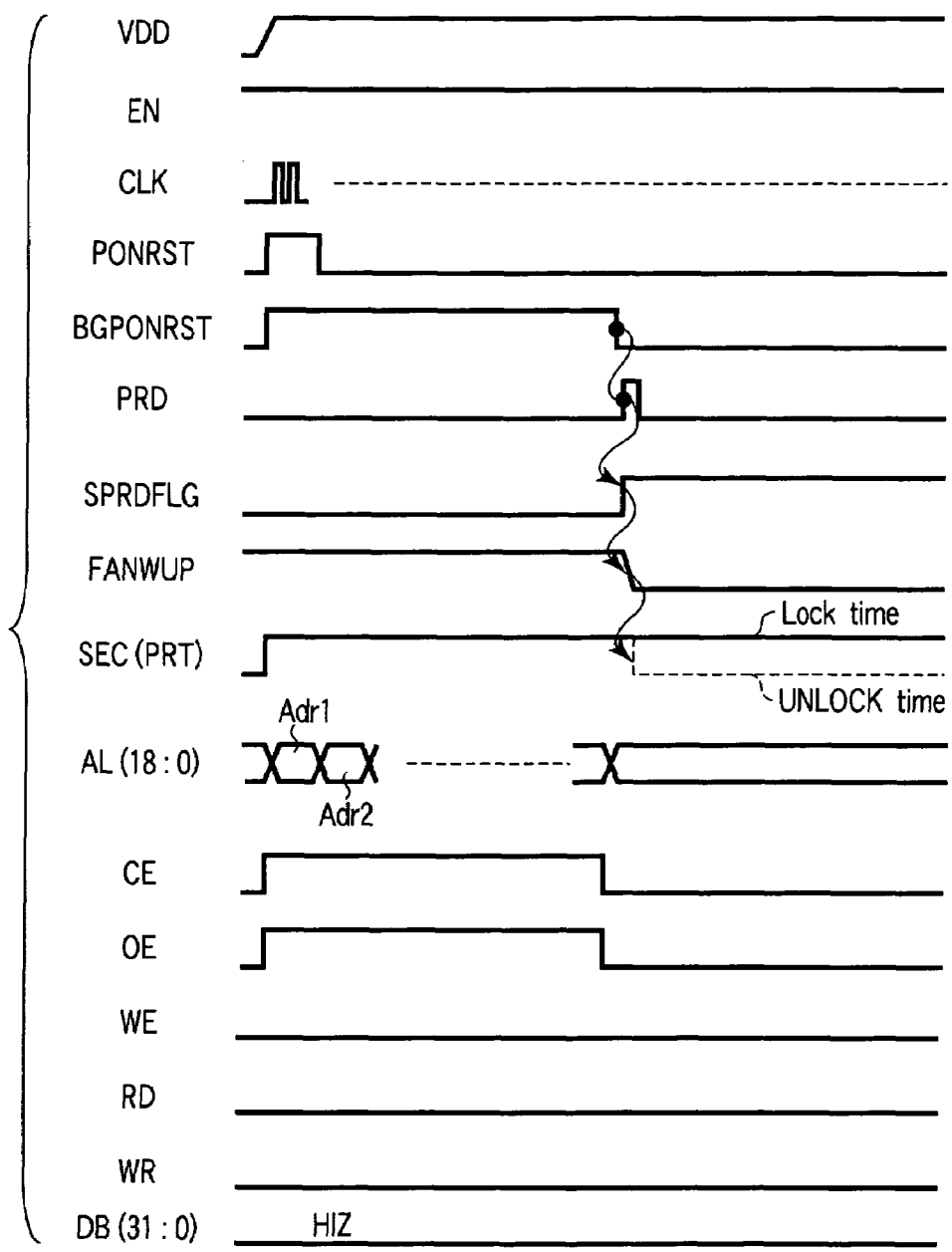
FIG. 12 is a timing chart that shows an operation example relating to protection at the time of turning on a power supply in another modified example of the nonvolatile semiconductor memory shown in FIG. 1.
Figure 14:
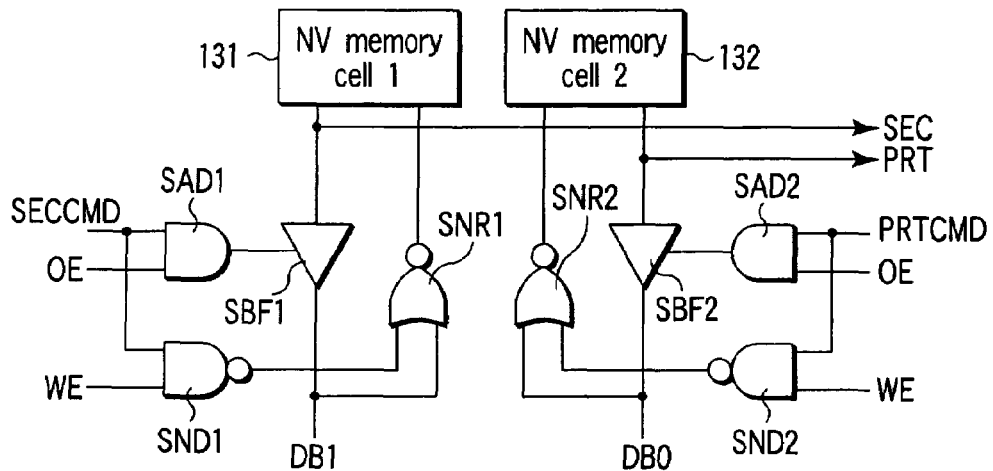
FIG. 14 is a circuit diagram that shows an SECPRT bit of the nonvolatile semiconductor memory shown in FIG. 13.
Figure 15:
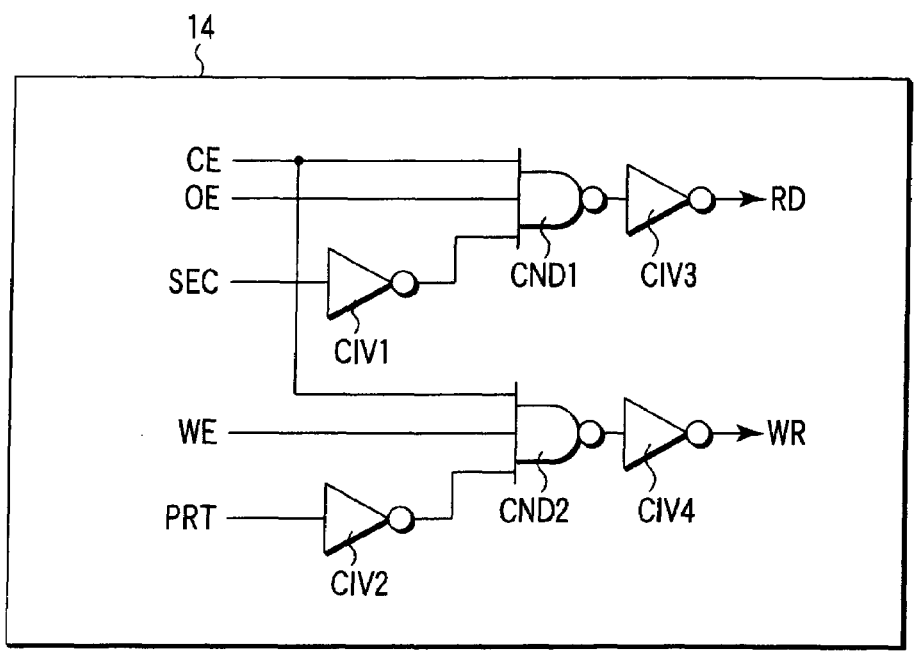
FIG. 15 is a circuit diagram that shows a structure of an R/W_CNT of the nonvolatile semiconductor memory shown in FIG. 13.
Figure 16:
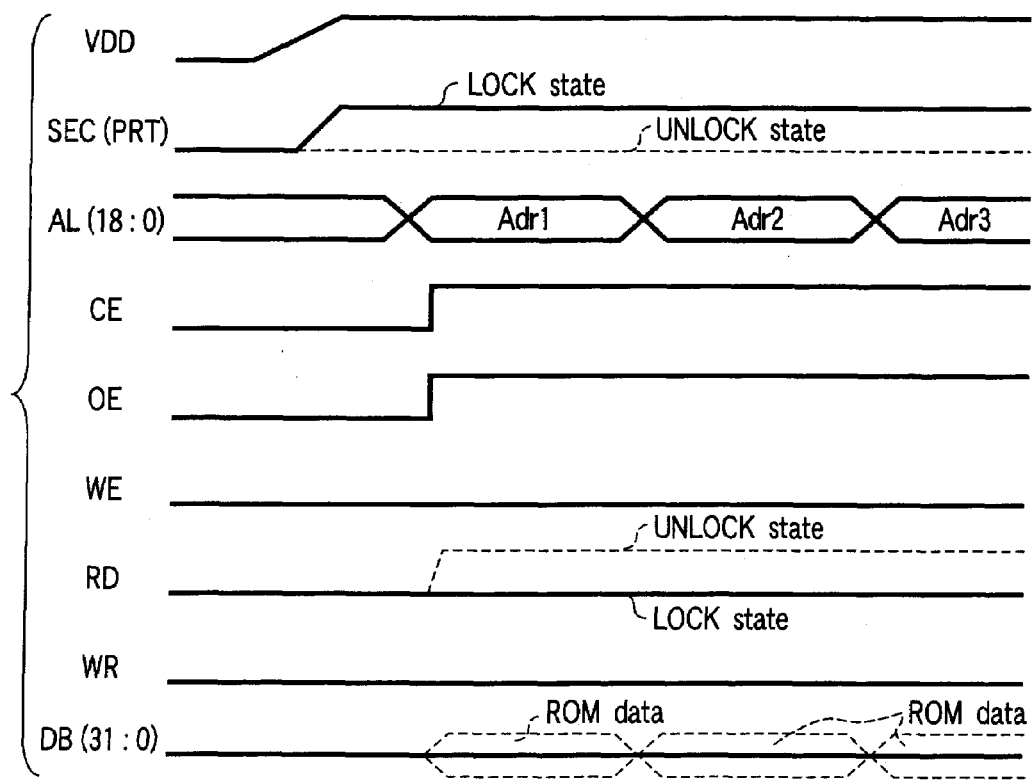
FIG. 16 is a timing chart that shows an operation example at the time of turning on a power supply of the nonvolatile semiconductor memory shown in FIG. 13.

Also, it is possible to perform permission or prohibition of writing data into the memory circuit alone, as shown in FIG. 12. FIG. 12 is a timing chart that shows an operation example relating to protection at the time of turning on a power supply in another modified example of the nonvolatile semiconductor memory shown in FIG. 1.

Furthermore, in the above embodiment, a readable and writable memory is used as the NV memory of the memory circuit 10. Instead, it is also possible to use a mask ROM, for example. In this case, it is also possible to prevent a reading of abnormal data and a leakage of data from the NV memory immediately after the turning on of the power supply.

It is possible to form the data protection system according to the above embodiment on a chip of a memory integrated circuit or a memory mixed-loaded logic chip having a memory loaded on the chip such as, for example, a microcomputer chip.

As described above, in the memory security control system according to the above embodiment, when the power supply is turned on or when a command is input, the security function and/or the protection function is automatically set to a lock state during a predetermined period from the power supply turn-on time or the command input time till the completion of the reading of the security bit SEC and the protection bit PRT. After a lapse of the predetermined period, the sequence operation of unlocking the lock state is automatically executed. As a result, it is possible to prevent the malfunction of the security function and/or the protection function (such as a reading of abnormal data, a leakage of confidential data from the memory, and a destruction of program data due to a writing of abnormal data into the memory).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory data protection system comprising:
   a memory circuit having an array of memory cells;
   a protection contents indicating section having non-volatile storage cells which store therein a security bit for indicating permission/prohibition of reading of data from the memory circuit and a protection bit for indicating permission/prohibition of writing of data to the memory circuit;
   a protection function circuit which determines permission/prohibition of reading of data from the memory circuit and permission/prohibition of writing of data to the memory circuit in accordance with the security bit and the protection bit stored in the protection contents indicating section; and
   a protection function locking/unlocking circuit which controls the protection function circuit in a manner that, the protection function locking/unlocking circuit makes the protection function circuit in a lock state to forcibly prohibit reading of data from the memory circuit and writing of data into the memory circuit in a time period from when a security/protection lock signal is generated or when a command is input until when the protection function circuit completes reading of the security bit and the protection bit from the protection contents indicating section into data buses, and after lapse of the time period, the protection function locking/unlocking circuit unlocks the lock state to enable the protection function circuit operative, wherein the protection function locking/unlocking circuit generates within the time period a control signal and supplies the control signal to the protection function circuit, and outputs the control signal as a monitoring signal.

2. A memory data protection system comprising:

a memory circuit having an array of memory cells;

a protection contents indicating section having non-volatile storage cells which store therein a security bit for indicating permission/prohibition of reading of data from the memory circuit and a protection bit for indicating permission/prohibition of writing of data to the memory circuit;

a protection function circuit which determines permission/prohibition of reading of data from the memory circuit and permission/prohibition of writing of data to the memory circuit in accordance with the security bit and the protection bit stored in the protection contents indicating section; and a protection function locking/unlocking circuit which controls the protection function circuit in a manner that, the protection function locking/unlocking circuit makes the protection function circuit in a lock state to forcibly prohibit reading of data from the memory circuit and writing of data into the memory circuit in a time period from when a security/protection lock signal is generated or when a command is input until when the protection function circuit completes reading of the security bit and the protection bit from the protection contents indicating section into data buses, and after lapse of the time period, the protection function locking/unlocking circuit unlocks the lock state to enable the protection function circuit operative, wherein the protection function locking/unlocking circuit comprises:

a protection function flag generating circuit which is reset when the power supply is turned on or when the command is input, and which after being reset generates a security bit read control signal and a protection bit read control signal for a short time period, and after the short time period generates a security/protection flag signal for a time period which is longer than the short time period; and a protection function control signal generating circuit which generates a lock/unlock signal which indicates a lock or an unlock state of security and protection based on the security/protection flag signal.

3. The memory data protection system according to claim 2, wherein the protection contents indicating section outputs the security bit to the data buses when an output enable control signal and a security command are received, and when the security bit read control signal is received, and the protection contents indicating section outputs the protection bit to the data buses when an output enable control signal and a protection command are received, and when the protection bit read control signal is received.

4. The memory data protection system according to claim 3, wherein the protection function circuit receives a chip enable control signal, the output enable control signal, the security bit read out from the protection contents indicating section, and the lock/unlock signal that is supplied from the protection function control signal generating circuit, and generates a read control signal for controlling reading from the memory circuit when the lock/unlock signal indicates the unlock state, and the protection function circuit receives the chip enable control signal, a write enable control signal, the protection bit read out from the protection contents indicating section, and the lock/unlock signal that is supplied from the protection function control signal generating circuit, and generates a write control signal for controlling writing into the memory circuit when the lock/unlock signal indicates the unlock state.

5. A memory data protection system comprising:

a memory circuit having an array of memory cells;

a protection contents indicating section having a non-volatile storage cell which stores therein a security bit for indicating permission/prohibition of reading of data from the memory circuit;

a protection function circuit which determines permission/prohibition of reading of data from the memory circuit in accordance with the security bit stored in the protection contents indicating section; and a protection function locking/unlocking circuit which controls the protection function circuit in a manner that, the protection function locking/unlocking circuit makes the protection function circuit in a lock state to forcibly prohibit reading of data from the memory circuit in a time period from when a security/protection lock signal is generated or when a command is input until when the protection function circuit completes reading of the security bit from the protection contents indicating section to a data bus, and after lapse of the time period, the protection function locking/unlocking circuit unlocks the lock state to enable the protection function circuit operative, wherein the protection function locking/unlocking circuit generates within the time period a control signal and supplies the control signal to the protection function circuit, and outputs the control signal as a monitoring signal.

6. A memory data protection system comprising:

a memory circuit having an array of memory cells;

a protection contents indicating section having a non-volatile storage cell which stores therein a security bit for indicating permission/prohibition of reading of data from the memory circuit;

a protection function circuit which determines permission/prohibition of reading of data from the memory circuit in accordance with the security bit stored in the protection contents indicating section; and a protection function locking/unlocking circuit which controls the protection function circuit in a manner that, the protection function locking/unlocking circuit makes the protection function circuit in a lock state to forcibly prohibit reading of data from the memory circuit in a time period from when a security/protection lock signal is generated or when a command is input until when the protection function circuit completes reading of the security bit from the protection contents indicating section to a data bus, and after lapse of the time period, the protection function locking/unlocking circuit unlocks the lock state to enable the protection function circuit operative, wherein the protection function locking/unlocking circuit comprises:

a protection function flag generating circuit which is reset when the power supply is turned on or when the command is input, and which after being reset generates a security bit read control signal for a short time period, and after the short time period generates a security flag signal for a time period which is longer than the short time period; and a protection function control signal generating circuit which generates a lock/unlock signal which indicates a lock or an unlock state of security based on the security flag signal.

7. The memory data protection system according to claim 6, wherein the protection contents indicating section outputs the security bit to the data buses when an output enable control signal and a security command are received, and when the security bit read control signal is received.

8. The memory data protection system according to claim 7, wherein the protection function circuit receives a chip enable control signal, the output enable control signal, the security bit read out from the protection contents indicating section, and the lock/unlock signal that is supplied from the protection function control signal generating circuit, and generates a read control signal for controlling reading from the memory circuit when the lock/unlock signal indicates the unlock state.

9. A memory data protection system comprising:

a memory circuit having an array of memory cells;

a protection contents indicating section having a non-volatile storage cell which stores therein a protection bit for indicating permission/prohibition of writing of data to the memory circuit;

a protection function circuit which determines permission/prohibition of writing of data to the memory circuit in accordance with the protection bit stored in the protection contents indicating section; and a protection function locking/unlocking circuit which controls the protection function circuit in a manner that, the protection function locking/unlocking circuit makes the protection function circuit in a lock state to forcibly prohibit writing of data into the memory circuit in a time period from when a security/protection lock signal is generated or when a command is input until when the protection function circuit completes reading of the protection bit from the protection contents indicating section to a data bus, and after lapse of the time period, the protection function locking unlocking circuit unlocks the lock state to enable the protection function circuit operative, wherein the protection function locking/unlocking circuit generates within the time period a control signal and supplies the control signal to the protection function circuit, and outputs the control signal as a monitoring signal.

10. A memory data protection system comprising:

a memory circuit having an array of memory cells;

a protection contents indicating section having a non-volatile storage cell which stores therein a protection bit for indicating permission/prohibition of writing of data to the memory circuit;

a protection function circuit which determines permission/prohibition of writing of data to the memory circuit in accordance with the protection bit stored in the protection contents indicating section; and a protection function locking/unlocking circuit which controls the protection function circuit in a manner that, the protection function locking/unlocking circuit makes the protection function circuit in a lock state to forcibly prohibit writing of data into the memory circuit in a time period from when a security/protection lock signal is generated or when a command is input until when the protection function circuit completes reading of the protection bit from the protection contents indicating section to a data bus, and after lapse of the time period, the protection function locking/unlocking circuit unlocks the lock state to enable the protection function circuit operative, wherein the protection function locking unlocking circuit comprises:

a protection function flag generating circuit which is reset when the power supply is turned on or when the command is input, and which after being reset generates a protection bit read control signal for a short time period, and after the short time period generates a protection flag signal for a time period which is longer than the short time period; and a protection function control signal generating circuit which generates a lock/unlock signal which indicates a lock or an unlock state of protection based on the protection flag signal.

11. The memory data protection system according to claim 10, wherein the protection contents indicating section outputs the protection bit to the data buses when an output enable control signal and a protection command are received, and when the protection bit read control signal is received.

12. The memory data protection system according to claim 11, wherein the protection function circuit receives a chip enable control signal, a write enable control signal WE, the protection bit read out from the protection contents indicating section, and the lock/unlock signal that is supplied from the protection function control signal generating circuit, and generates a write control signal for controlling writing into the memory circuit when the lock/unlock signal indicates the unlock state.

13. A memory data protection system comprising:

a memory circuit having an array of memory cells;

a protection contents indicating section having non-volatile storage cells which store therein a security bit for indicating permission/prohibition of reading of data from the memory circuit and a protection bit for indicating permission/prohibition of writing of data to the memory circuit;

a protection function circuit which determines permission/prohibition of reading of data from the memory circuit and permission/prohibition of writing of data to the memory circuit in accordance with the security bit and the protection bit stored in the protection contents indicating section; and a protection function locking/unlocking circuit which controls the protection function circuit in a manner that, the protection function locking/unlocking circuit makes the protection function circuit in a lock state to forcibly prohibit reading of data from the memory circuit and writing of data into the memory circuit in a time period from when a security/protection lock signal is generated or when a command is input until when the protection function circuit completes reading of the security bit and the protection bit from the protection contents indicating section into data buses, and after lapse of the time period, the protection function locking/unlocking circuit unlocks the lock state to enable the protection function circuit operative, wherein the security/protection lock signal is determined by a power-on reset signal and a security and protection unlock signal.

14. The memory data protection system according to claim 13, wherein the power-on reset signal is a one-shot pulse that becomes in a short-time "1" level when a power supply is turned on, and the security and protection unlock signal becomes "0" level for a predetermined period from generation of the power-on reset signal until immediately after generation of a protection bit read control signal and a security bit read control signal that become in a short-time "1" level.

* * * * *